(12) United States Patent
Salama et al.

(10) Patent No.: US 11,544,702 B2
(45) Date of Patent: Jan. 3, 2023

(54) PROVISIONING OF SECURE APPLICATION

(71) Applicant: The Toronto-Dominion Bank, Toronto (CA)

(72) Inventors: Hisham Ibrahim Salama, Toronto (CA); Paul Mon-Wah Chan, Markham (CA); John Jong Suk Lee, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 1122 days.

(21) Appl. No.: 15/285,129

(22) Filed: Oct. 4, 2016

(65) Prior Publication Data
US 2018/0096345 A1  Apr. 5, 2018

(51) Int. Cl.
| | |
|---|---|
| *G06Q 20/36* | (2012.01) |
| *G06F 21/62* | (2013.01) |
| *G06Q 20/32* | (2012.01) |
| *G06Q 20/34* | (2012.01) |
| *G06F 21/57* | (2013.01) |
| *H04W 12/08* | (2021.01) |
| *H04W 12/30* | (2021.01) |
| *H04W 12/47* | (2021.01) |

(Continued)

(52) U.S. Cl.
CPC ........ *G06Q 20/3674* (2013.01); *G06F 21/57* (2013.01); *G06F 21/629* (2013.01); *G06F 21/6245* (2013.01); *G06Q 20/322* (2013.01); *G06Q 20/356* (2013.01); *G06Q 20/3574* (2013.01); *H04W 12/0431* (2021.01); *H04W 12/062* (2021.01); *H04W 12/069* (2021.01); *H04W 12/08* (2013.01); *H04W 12/35* (2021.01); *H04W 12/47* (2021.01); *H04W 12/48* (2021.01)

(58) Field of Classification Search
CPC .................................................. G06Q 20/3674
See application file for complete search history.

(56) References Cited

U.S. PATENT DOCUMENTS

| | | | |
|---|---|---|---|
| 8,326,753 | B2 | 12/2012 | Easterly et al. |
| 8,918,080 | B2 | 12/2014 | Neal et al. |

(Continued)

OTHER PUBLICATIONS

Apple Pay Security and Privacy Overview; https://support.apple.com/en-ca/HT203027.

(Continued)

*Primary Examiner* — Arunava Chakravarti
(74) *Attorney, Agent, or Firm* — Rowand LLP

(57) ABSTRACT

Methods and devices for provisioning a secure application on an electronic device with first issuer data for a first issuer are described. In an embodiment, the provisioning system receives and stores first issuer records. The example provisioning system receives a provisioning request to provision the secure application with the first issuer data. The provisioning request includes identifying information. The example provisioning system evaluates the provisioning request based on at least one of the first issuer evaluation criteria, the first issuer records and the identifying information in the provisioning request. When the provisioning request satisfies the first issuer evaluation criteria, the example provisioning system generates a signal using the communication module to provide the first issuer data to the electronic device to provision the secure application on the electronic device.

16 Claims, 5 Drawing Sheets

(51) Int. Cl.
*H04W 12/48* (2021.01)
*H04W 12/062* (2021.01)
*H04W 12/069* (2021.01)
*H04W 12/0431* (2021.01)

(56) References Cited

U.S. PATENT DOCUMENTS

| | | |
|---|---|---|
| 2003/0055785 A1 | 3/2003 | Lahiri |
| 2009/0234751 A1 | 9/2009 | Chan et al. |
| 2012/0022945 A1* | 1/2012 | Falkenborg ........ G06Q 30/0255 705/14.53 |
| 2012/0158590 A1 | 6/2012 | Salonen |
| 2013/0110658 A1 | 5/2013 | Lyman et al. |
| 2013/0325569 A1 | 12/2013 | Holmes et al. |
| 2014/0031009 A1* | 1/2014 | Vendrow ................ G06Q 20/32 455/410 |
| 2014/0250006 A1 | 9/2014 | Makhoutin et al. |
| 2014/0344153 A1 | 11/2014 | Raj et al. |
| 2015/0046339 A1* | 2/2015 | Wong ................... G06Q 20/382 705/71 |
| 2015/0327072 A1* | 11/2015 | Powell .................. G06Q 20/32 455/411 |
| 2016/0098702 A1* | 4/2016 | Marshall .............. G06Q 20/425 705/44 |

OTHER PUBLICATIONS

Apple Pay: Bridging Online and Big Box Fraud; http://krebsonsecurity.com/2015/03/apple-pay-bridging-online-and-big-box-fraud/, posted on Mar. 11, 2015, filed under Latest Warnings, The Coming Storm, Web Fraud 2.0.

ApplePay Fraud points to Looming Problems with Mobile Payments by Avivah Litan, Mar. 2, 2015; http://blogs.gartner.com/avivah-litan/2015/03/02/applepay-fraud-points-to-looming-problems-with-mobile-payments/#comments.

European Central Bank: Recommendations for the Security of Mobile Payments; http://www.ecb.europa.eu/paym/cons/pdf/131120/recommendationsforthesecurityofmobilepaymentsdraftpc201311en.pdf, dated Nov. 2013.

* cited by examiner

PROVISIONING OF SECURE APPLICATION

FIELD

The present application generally relates to secure applications and, more particularly, to the provisioning of a secure application on a computing device.

BACKGROUND

Modern computing devices, such as smartphones and smartwatches, are often equipped for mobile payments. For example, such devices often include a mobile wallet application. The mobile wallet application can be loaded with payment credentials, such as credit card information, to allow the mobile computing device to communicate payment information to a point of sale terminal during a transaction.

Typically, before the mobile wallet application can be used to complete a transaction at a point of sale terminal, the mobile wallet application must be provisioned. This provisioning may involve sending a provisioning request from the mobile wallet application to a network provider (such as Visa™, Mastercard™, etc.). The network provider then identifies an issuer, such as a bank, who is the issuer of a payment card associated with the provisioning request. The network provider authenticates the provisioning request using the identified issuer's database. The provisioning request may be sent to the issuer in a bulk transmission which includes a numerous provisioning requests. The issuer determines whether the provisioning request will be approved or denied and informs the network provider. If the issuer determines that the provisioning request will be approved, the mobile wallet application is provisioned and can then be used for a transaction at a point of sale terminal.

Such provisioning systems tend to be quite slow. In many cases, it may take over an hour to complete provisioning and, in some cases, even a full day. Furthermore, in such systems, the issuer evaluating the provisioning request has limited information available when assessing whether to approve the provisioning request which may result in poor approval or denial decisions.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1:
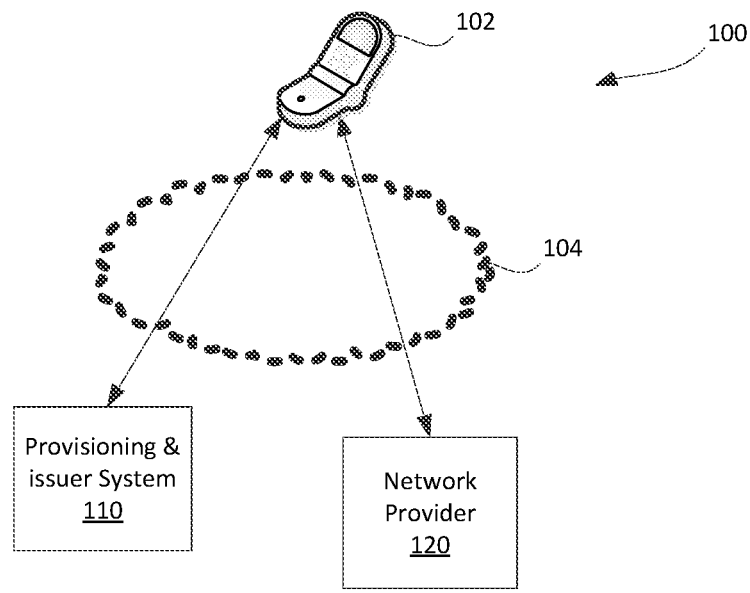
FIG. 1 is a block diagram of an arrangement of components used in provisioning a secure application on an electronic device in accordance with example embodiments.

In one aspect, the present application describes a provisioning system for provisioning a secure application on an electronic device with first issuer data for a first issuer. The provisioning system includes a communication module and a memory having stored therein first issuer evaluation criteria. The provisioning system also includes a processor coupled with the memory and the communication module. The processor is programmed with processor-executable instructions which, when executed, cause the processor to: receive a signal via the communication module representing first issuer records from a first issuer system associated with the first issuer, the first issuer records including customer data for a plurality of customers associated with the first issuer; store at least a portion of the first issuer records in the memory; receive a signal via the communication module from the electronic device representing a provisioning request to provision the secure application with the first issuer data, the provisioning request including identifying information; evaluate the provisioning request based on at least one of the first issuer evaluation criteria, the first issuer records and the identifying information in the provisioning request; and when the provisioning request satisfies the first issuer evaluation criteria, generate a signal using the communication module to provide the first issuer data to the electronic device to provision the secure application on the electronic device.

In another aspect, the present application describes a processor-implemented method for provisioning a secure application on an electronic device with first issuer data for a first issuer. The method includes: receiving a signal via a communication module representing first issuer records from a first issuer system associated with the first issuer, the first issuer records including customer data for a plurality of customers associated with the first issuer; storing at least a portion of the first issuer records in the memory; receiving a signal via the communication module from the electronic device representing a provisioning request to provision the secure application with the first issuer data, the provisioning request including identifying information; evaluating the provisioning request based on at least one of the first issuer evaluation criteria, the first issuer records and the identifying information in the provisioning request; and when the provisioning request satisfies the first issuer evaluation criteria, generating a signal using the communication module to provide the first issuer data to the electronic device to provision the secure application on the electronic device.

In another aspect, the present application describes a non-transitory computer readable storage medium storing computer-executable instructions which, when executed, cause a processor to perform a method described herein.

In another aspect, the present application describes an electronic device. The electronic device includes a communication module and an input interface. The electronic device also includes a processor coupled to the communication module and the input interface and a memory coupled to the processor. The memory stores a first secure application and a second secure application. The first secure application, when executed, configures the processor to: receive, through the input interface, an account identifier; identify an issuer associated with the account represented by the account identifier; determine that the second secure application is installed on the electronic device; and provide a provisioning request to the second secure application.

In a further aspect, the present application describes a processor-implemented method for provisioning a secure application on an electronic device with first issuer data for a first issuer. The method includes: receiving, through the input interface, an account identifier; identifying an issuer associated with the account represented by the account identifier; determining that the second secure application is installed on the electronic device; and providing a provisioning request to the second secure application.

Other aspects and features of the present application will be understood by those of ordinary skill in the art from a review of the following description of examples in conjunction with the accompanying figures.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

Described herein are techniques for provisioning an electronic device to allow the electronic device to be used as a payment device. More particularly, an electronic device such as a mobile device, may be provisioned by a provisioning system to allow the electronic device to be used for mobile payments at a point of sale (POS) terminal. After the electronic device 102 has been provisioned, the electronic device may be used at a POS terminal to process a payment to a party, such as a merchant, associated with the POS terminal. For example, the electronic device 102 may transmit a secure token or other identifier to the POS terminal during a transaction. This secure token or identifier may be provided by the electronic device based on issuer data that is provided by an issuer, such as a credit card issuer.

This secure token or other identifier may be transmitted over a short range communication system, such as a near field communication (NFC) interface. The POS terminal uses this token in order to determine whether a transaction is to be approved or declined. For example, the POS terminal may communicate with an issuer system via a network provider and may provide the token or other secure information to the issuer system. The issuer system may be operated by a bank and the network provider may be a credit card network provider such as Visa™, Mastercard™ or American Express™. The network provider relays transaction information and the token or other secure information to the issuer system which approves or denies the transaction and then sends a message to the POS terminal, either approving or declining the transaction.

The secure token or other identifier is used to authenticate the transaction. That is, the secure token or other identifier is used to confirm that the initiator of the transaction is, in fact, a device which has been granted approval to access an account associated with the issuer.

Thus, before a mobile payment can be performed using an electronic device, the electronic device may first be provisioned with issuer data, such as a token, which may be used to authenticate a transaction. Described below are systems, devices and methods for provisioning electronic devices.

An overview having been provided, reference will now be made to FIG. 1 which illustrates an arrangement 100 of components in accordance with an embodiment of the present application.

In FIG. 1, an example electronic device 102 is shown. The example electronic device is a mobile device. However, the electronic device 102 may be a computing device of another type such as a personal computer, a laptop computer, a tablet computer, a notebook computer, a hand-held computer, a personal digital assistant, a portable navigation device, a mobile phone, a smart phone, a wearable computing device (e.g., a smart watch, a wearable activity monitor, wearable smart jewelry, and glasses and other optical devices that include optical head-mounted displays), an embedded computing device (e.g., in communication with a smart textile or electronic fabric), and any other type of computing device that may be configured to store data and software instructions, and execute software instructions to perform operations consistent with disclosed embodiments. In certain embodiments, the electronic devices may be associated with one or more users. For instance, a user may operate the electronic device, and may do so to cause the electronic devices to perform one or more operations consistent with the disclosed embodiments. In some aspects, electronic devices 102 may include a smart card, chip card, integrated circuit card (ICC), and/or other card having an embedded integrated circuit.

The electronic device 102 is in communication with a provisioning system and an issuer system and, in the example, the provisioning system and issuer system are provided on a single system, referred to as a provisioning and issuer system 110. That is, in the example embodiment, an issuer (such as a bank) of an account that an electronic device 102 is to be provisioned for use with operates the provisioning system. However, as will be described below with reference to FIG. 4, the provisioning system may be distinct from the issuer system in some embodiments.

The provisioning system functions to provision the electronic device 102 so that the electronic device may be used for mobile payments. More particularly, the provisioning system provisions a secure application, such as a mobile wallet application, on the electronic device 102. For example, the provisioning system receives a request from the electronic device to provision the electronic device 102 for use with an account provided by an issuer. The account may be a credit card account provided by the issuer, which may be a bank and, in response to receiving the request, the provisioning system evaluates the request and selectively configures the electronic device to use that account for mobile payments.

The electronic device 102 may also be in communication with a network provider 120 associated with the account. The network provider provides networks services to POS terminals and may be a credit card network provider such as Visa™, Mastercard™ or American Express™. In at least some embodiments, the network provider may also take part in the provisioning process.

During one or more of the provisioning methods described herein, the electronic device 102 may connect to the provisioning and issuers system 110 and the network provider 120 through a network 104. The network 104 may include public networks (e.g. the Internet), private networks, virtual private networks (VPNs), wired networks, wireless networks, and combinations thereof. In at least some embodiments, messages that are sent between the electronic device and the provisioning and issuer system 110 and between the electronic device 102 and the network provider 120 during the provisioning process may be packet-based messages sent over a packet based network 104.

Figure 2:
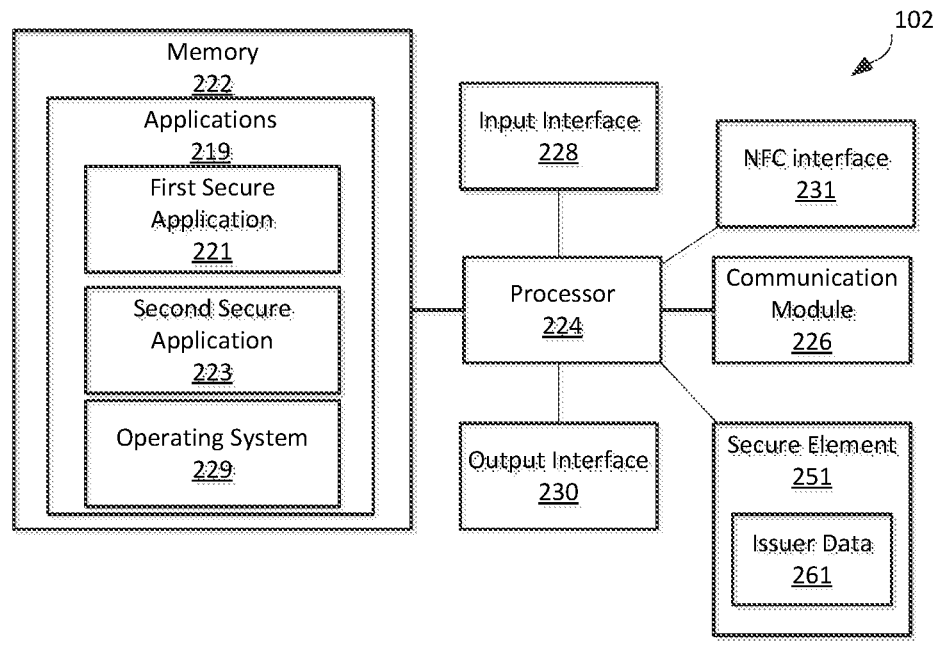
FIG. 2 is a block diagram of an electronic device in accordance with example embodiments.

Referring now to FIG. 2, a block diagram of an example electronic device 102 is illustrated. The example electronic device 102 includes at least one processor 224. The processor is coupled to a memory 222, a communication module 226, a secure element 251, and device subsystems such as an input interface 228 (which may include a keyboard, touchscreen, camera, button, etc.), an output interface 230 (which may be a display, speaker, vibrator, etc.), and a short range communication interface such as a near field communication (NFC) interface 231.

The communication module 226 may include subsystems for wired or wireless data communication. The communication module 226 allows the electronic device 102 to send and receive electronic messages. For example, the communication module 226 may allow electronic messages to be sent and received over the network 104 (FIG. 1).

The memory 222 may include volatile and non-volatile memory. At least a part of the memory 222 may store processor-readable instructions that, when executed by the processor, cause the processor 224 to carry out some of the operations described herein. The processor-readable instructions may be provided in one or more applications 219. For example, an operating system 229 may control overall device operations.

The applications 219 include a first secure application 221, which may be a mobile wallet application, and a second secure application 223 which may be a banking application. The mobile wallet application allows payment credentials to be loaded into the mobile wallet application and to be used when completing a mobile payment at a POS terminal.

More particularly, the mobile wallet application may be provisioned using provisioning techniques described herein so that the mobile wallet application may be used with a credit card provided by a bank. During this provisioning process, memory of the electronic device 102 may be loaded with issuer data 261 for the issuer of the credit card (e.g., the bank). This issuer data 261 may include a secure token or other identifier and it may be stored in a secure element 251.

The secure element (SE) 251 is a tamper-resistant platform (such as a one chip secure microcontroller) that is capable of securely hosting applications and their cryptographic and confidential data. The SE 251 may be a universal integrated circuit card (UICC), an embedded SE or a microSD secure element. In some embodiments, the SE 251 is embedded in the electronic device 102 and in others it is removable. For example, it may be provided on a subscriber identity module (SIM) card which also facilitates communications over the network 104.

During a mobile payment, the electronic device 102 may be moved in close proximity to a POS terminal and the mobile payment application may cause the issuer data 261 (such as the secure token or other identifier) to be transmitted, or used to encrypt data that is transmitted to the POS terminal using the NFC interface 231.

The second secure application 223 may be a banking application. The banking application cooperates with a mobile banking system to provide banking features such as, for example, the ability to view bank account balances, transfer funds between accounts, pay bills, etc. The banking application is a highly secure application and, when the application is initiated, it prompts a user, via an output interface 230 such as a display, for input of account credentials, such as an account number and a password. The account number may be a bank account number. The banking application may, for example, include security features such as 128-bit encryption for communications, "strong" password creation rules, and preventing the display of account number information and/or password information on the display. Thus the banking application has high-level security features. As will be described below, these security features may, in some embodiments, be leveraged for the provisioning of the first secure application 221.

In many instances credit card users may obtain a credit card from a bank that they also bank with. For example, a user might use banking products (such as chequing or savings accounts) provided by a particular bank and might also use credit products (such as a credit card) provided by that same bank. In order to take part in mobile banking, such users may install, on the electronic device 102, the mobile banking application (which is referred to as a second secure application 223 in FIG. 2). That same user may wish to take part in mobile payments using the electronic device 102 on which the mobile banking application has been installed. To do so, the user may need to provision a first secure application 221, such as a mobile wallet application, so that the mobile wallet application may be used with the credit card. For example, the user may need to provision the first secure application 221 so that issuer data 261 associated with the credit card is loaded onto memory of the electronic device (e.g., the secure element 251) to allow the issuer data 261 to be used in a transaction.

As will be described in greater detail below with reference to FIG. 3, in some such embodiments, the electronic device may utilize a second secure application 223 (e.g., a banking application) when provisioning a first secure application 221 (e.g., a mobile wallet application). More particularly, since the second secure application 223 is already configured to provide a secure communication channel for communicating with the bank, who is the issuer of the credit card, the second secure application 223 may be used during the provisioning. As will be described in greater detail below, this may allow the provisioning to proceed with a more direct connection to the issuer than legacy provisioning techniques which often use the network provider 120 to relay provisioning requests to an issuer. By utilizing the mobile banking application's direct connection with the bank, the provisioning of the mobile wallet application for use with the credit card may be performed quickly. Furthermore, since the banking application allows a user to input bank account login information (such as a bank account number, or PAN), the provisioning system or issuer can use this information in order to determine whether to provision the mobile wallet application. More particularly, during the provisioning process, the bank account number and the credit card number may be cross-referenced to ensure that the identified credit card and identified bank account are associated with the same party.

Figure 3:
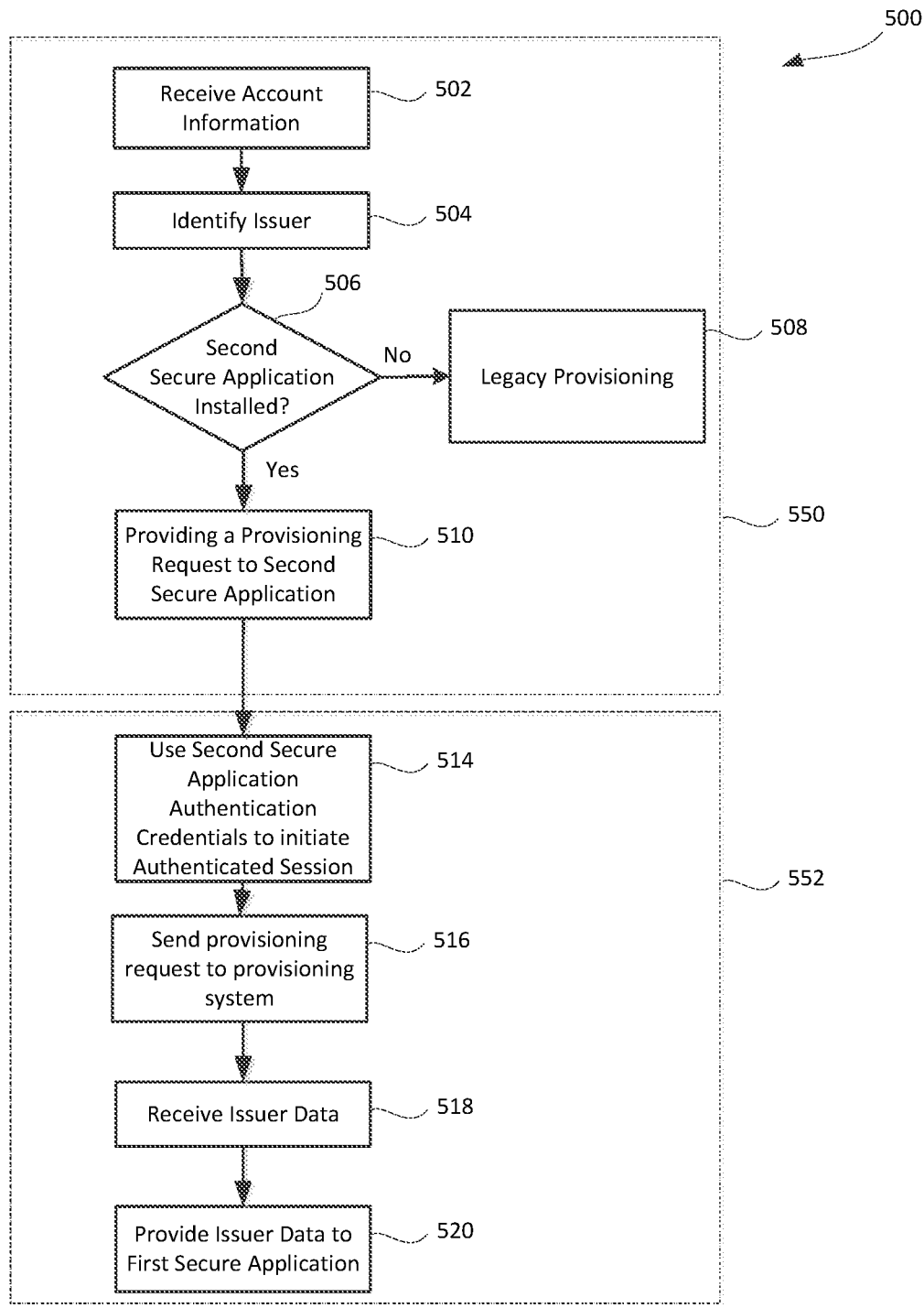
FIG. 3 is a flowchart of a method for provisioning a first secure application in accordance with example embodiments.

Reference will now be made to FIG. 3 which illustrates a flowchart of an example method 500 that may be performed by an electronic device 102 to provision a first secure application 221 on the electronic device 102. The method 500 may be performed by a processor 224 which executes processor-executable instructions stored in memory 222. The processor executable instructions may be provided in applications 219, including the first secure application 221 (which may be a mobile wallet application) and a second secure application 223 (which may be a banking application). For example, the first secure application 221 may, when executed, configure the processor 224 to perform a first portion 550 of the method 500 and the second secure application 223 may, when executed, configure the processor 224 to perform a second portion 552 of the method 552.

In at least some embodiments, prior to the method 500 being performed, the first secure application may be launched on the electronic device 102. The first secure application may, for example, be launched in response to a user instruction to launch the first secure application.

At operation 502, the electronic device receives account information, such as an account identifier, through an input interface 228 (FIG. 2) associated with the electronic device. For example, in some embodiments, a user may use a finger-activated input interface, such as a physical or virtual keyboard to input the account information. The account information may include a primary account number (PAN), which may also be referred to as a card number. The PAN is card number that is associated with either a debit card or a credit card. The account information may also include an expiry date and/or a card verification value (CVV).

In some embodiments, the account information may be received from a camera. More particularly, the electronic device 102 may analyze an image obtained by the camera to obtain the account information. The image represents a card associated with an account, such as a credit card or a debit card. The electronic device may identify the account information in the image using optical character recognition (OCR).

At operation 504, the electronic device identifies the issuer associated with the account represented by the account information (e.g., by an account identifier such as a PAN). The issuer may be identified using various techniques. For example, in one embodiment, the issuer may be identified through user input received at an input interface associated with the electronic device. For example, the user may select a financial institution who issued the credit card or debit card associated with the identified PAN. In other embodiments, the identification of the issuer may be automatic. That is, the issuer may be identified without direct user selection of the issuer. For example, in an embodiment in which an image of a card is used to identify account information, the image may be analyzed by the electronic device to identify the issuer. During this analysis, the electronic device may compare visual attributes of the card represented in the image to visual attributes in a database. The database associates visual attributes of cards with specific issuers. By way of example, the electronic device may identify, using the database, a logo associated with a particular financial institution (e.g., a logo of a bank). In some embodiments, OCR techniques may be performed by the electronic device on the image to identify text on the card and that text may be parsed for issuer identification information (e.g., the electronic device may look for "TD", "Toronto Dominion", etc. in order to identify a card associated with the Toronto-Dominion Bank™).

In some embodiments, the electronic device may identify the issuer from the PAN itself. For example, the PAN may be formatted according to a numbering system in which a certain pattern of numbers may indicate a certain issuer and, when the electronic device identifies such a pattern, it identifies the associated issuer. For example, the PAN may include a bank identification number (BIN) portion or an issuer identification number (IIN) portion which may be used by the electronic device 102 to identify the issuer.

In some embodiments, the electronic device may provide the PAN, or a portion of the PAN to a database which returns an issuer identifier to the electronic device.

After identifying the issuer, at operation 506, the electronic device 102 determines whether a second secure application, which is associated with the identified issuer, is installed on the electronic device. For example, in some embodiments, the electronic device identifies a particular bank as the issuer at operation 504 and then, at operation 506, determines, based on the identified issuer, whether a banking application associated with the identified bank (i.e., with the bank that is the issuer) is installed on the electronic device 102.

If the second secure application 223 is not installed on the electronic device, then at operation 508, the electronic device may use legacy provisioning techniques to provision the electronic device. For example, the electronic device may send a provisioning request from the mobile wallet application to a network provider (such as Visa™, Master-card™, etc.). The network provider then identifies an issuer, such as a bank, who is the issuer of a payment card associated with the provisioning request. The network provider then relays the provisioning request to the identified issuer. If the issuer determines that the provisioning request will be approved, the mobile wallet application is provisioned and can then be used for a transaction at a point of sale terminal.

Alternatively, in some embodiments, in response to determining that the second secure application 223 is not installed on the electronic device, the electronic device may install the second secure application 223. The installation may be performed automatically or in response to user input. For example, in one embodiment, upon determining that the second secure application 223 is not installed on the electronic device, the electronic device generates a prompt on an output interface 230 (FIG. 2) to ask a user whether the second secure application 223 should be installed on the electronic device. If the electronic device determines that an input command that indicates that the second secure application 223 should be installed is received through an input interface 228 associated with the electronic device, then the electronic device may install the application. If an input is received that indicates that the second secure application 223 should not be installed on the electronic device, then the legacy provisioning techniques of operation 508 may be performed.

If, however, the electronic device determines (at operation 506) that the second secure application is installed on the electronic device, then at operation 510, a provisioning request is provided from the first secure application 221 to the second secure application 223. Providing the provisioning request to the second secure application 223 at operation 510 may include invoking the second secure application 223. Accordingly, at operation 510 the second secure application 223 may be launched, if it is not already launched. In at least some embodiments, at operation 510, the provisioning request is provided to the second secure application 223 as an application programming interface (API) call to an API provided by the second secure application 223. However, the provisioning request may be provided using other techniques in other embodiments.

The provisioning request includes identifying information. This identifying information includes account information such as the account information received at operation 502. For example, this identifying information may include an account identifier such as a PAN and may include other identifying information associated with the PAN, such as an expiry date and/or a CVV.

In some embodiments, the provisioning request may also include an account identifier for a second account for which the first secure application has already been provisioned. That is, the provisioning request may include second issuer profile information for a second issuer associated with second issuer data for which the secure application has already been provisioned. By way of example, if the first secure application has already been provisioned for use with another card (which may be a card provided by the same issuer or a card provided by another issuer), the provisioning request may include an account identifier which identifies that card. By way of example, a PAN for another card that a mobile wallet application has already been configured to use may be provided in the provisioning request.

The provisioning request may include other identifying information which may be obtained from user records stored in memory of the electronic device or from other data stored in memory of the electronic device, or from sensors or subsystems provided on the electronic device. For example, in some embodiments, a geolocation of the electronic device may be included in the provisioning request. The geolocation identifies a present location of the electronic device. The electronic device may obtain the geolocation of the electronic device from a location subsystem (not shown) coupled to the processor. The location subsystem may, for example, include a global positioning system (GPS) component.

The provisioning request may also include address or contact information associated with a user of the electronic device such as, for example, a telephone number associated with the electronic device or an email address associated with the electronic device. The email address may be an email address for which the electronic device has been configured to receive emails and the telephone number may be a telephone number for which the electronic device has been configured to receive telephone calls.

The provisioning request may also include other login credentials associated with the electronic device or its user. By way of example, a social network username or handle (such as a Facebook™, Instagram™ or Twitter™ username) or a login credential for another service or set of services (such as an Apple ID™ or Gmail™ username) may be included in the provisioning request.

In at least some embodiments, the electronic device may also include version information associated with the electronic device in the provisioning request. This version information may, for example, be a version number of the device's operating system 229 (FIG. 2) or the first secure application 221 (FIG. 2).

The electronic device may configure the provisioning request to include an identifier of the electronic device (which may be referred to as a device identifier). The device identifier may be an International Mobile Station Equipment Identity (IMEI) number. In some embodiments, the electronic device may configure the provisioning request to include an international mobile subscriber identity (IMSI).

As will be described below with reference to FIGS. 5 and 6, a provisioning system may use the identifying information in the provisioning request to determine whether to approve or deny a provisioning request.

Operations 502 to 510 of the method 500 may be performed by the processor 224 due to execution of the first secure application 221. That is, the first secure application 221, when executed, may configure the processor to perform the operations 502 to 510 of the method 500. However, after the provisioning request is provided to the second secure application, the second secure application may be invoked to perform a portion 552 of the method.

At operation 514, when the provisioning request is provided to the second secure application 223 from the first secure application 221 and is received at the second secure application 223, the second secure application causes the processor to (at operation 514) initiate an authenticated session with a provisioning system using authentication credentials associated with the second secure application. For example, the second secure application may be configured to generate a prompt on an output interface 230 (FIG. 2) such as a display which requests input of authentication credentials. The authentication credentials are login credentials associated with the second secure application. For example, the second secure application may prompt for input of an account number, such as a bank account number. The account number is, in at least some embodiments, a different number than account identifier (e.g., PAN) received at operation 502. That is, the account identifier which is received at operation 502 may identify an account associated with a payment instrument, such as a credit card, while the account number that is prompted for during operation 514 may identify a bank account that is provided by the same issuer as the credit card. The second secure application may also prompt for a password or personal identification number (PIN). After the prompt is provided, the electronic device receives input of the requested account number and password/PIN and may provide this data, in an encrypted format, to an issuer system. That is, a communication module 226 provided on the electronic device is controlled to generate a signal representing the authentication credentials. This signal is sent to an issuer system which authenticates the request, allowing an authenticated session to be established with a provisioning system.

As described above with reference to FIG. 1, in some embodiments, the provisioning system and the issuer system may be a common system (i.e., on a provisioning and issuer system 110). In such embodiments, this system authenticates the authentication credentials and evaluates an authentication request. In other embodiments (such as the embodiment of FIG. 4), the authentication functions and provision request processing functions may be divided. For example, an issuer system may receive and authenticate the authentication credentials and may then setup an authenticated session between the electronic device and a separate provisioning system so that the provisioning system may evaluate the authentication request.

Figure 4:
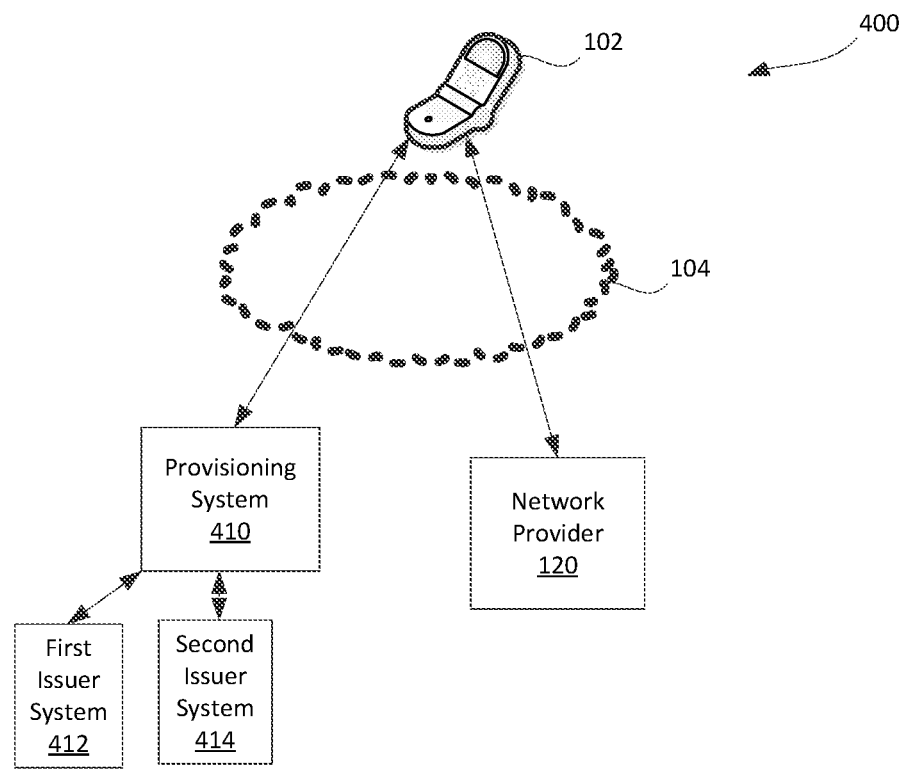
FIG. 4 is a block diagram of an arrangement of components used in provisioning a secure application on an electronic device in accordance with example embodiments.

At operation 516, a signal is generated using the communication module 226 (FIG. 2) to provide the provisioning request to the provisioning system (which may be the provisioning and issuer system 110 of FIG. 1 or a separate standalone provisioning system, such as the provisioning system 410 of FIG. 4).

The provisioning request includes identifying information of the type described above with reference to operation 510. For example, the provisioning request may include one or more of: an account identifier (such as a PAN), an expiry date, a CVV, an account identifier for a second account for which the first secure application has already been provisioned, a geolocation of the electronic device, address or contact information such as an email address or telephone number, login credentials, version information, a device or subscriber identifier, etc.

If the provisioning request is approved by the provisioning system, the electronic device receives (at operation 518) issuer data from the provisioning system. This issuer data is provided (at operation 520) to the first secure application 221 and it may be stored by the first secure application 221 in secure storage such as in the secure element 251.

In some embodiments, after the provisioning request has been approved by the provisioning system, the electronic device may communicate with a network provider 120 (FIG. 1) in order to finalize the provisioning. Accordingly, in at least some embodiments, operation 520 of the method 500 may include sending or receiving signals representing messages from the network provider 120.

While not illustrated in FIG. 3, if the provisioning system determines that the provisioning request is to be declined, a signal, representing a "request denied" message may be received at the electronic device. In response to receiving such a message, the electronic device may generate an output on an output interface informing a user that the request has been denied. The message may provide a telephone number that a user may contact.

In some embodiments, which will be explained in greater details below with reference to FIG. 7, the provisioning system evaluates the provisioning request against defined criteria. If the provisioning request does not meet the defined criteria, then the provisioning system may deactivate an account that the first secure application 221 has already been configured for use with. For example, if the provisioning system determines that the provisioning request appears to be fraudulent, then it may send an instruction to the electronic device to deactivate a second account associated with the first secure application. For example, if a mobile wallet application has already been provisioned for use with a credit card and the mobile wallet application submits a provisioning request to provision the mobile wallet application for use with another credit card, and if the provisioning system determines that the provisioning request does not meet defined criteria, then the provisioning system may send a command to deactivate the credit card that the mobile wallet has already been provisioned to use (i.e., to deactivate a second account on the mobile wallet application). In response to receiving this instruction, the electronic device deactivates this credit card. For example, issuer data stored on the electronic device for use with this credit card may be deleted.

Reference will now be made to FIG. 4 which illustrates an arrangement 400 of components in accordance with an embodiment of the present application. The arrangement 400 of FIG. 4 includes one or more components described above with reference to FIG. 1. For example, an electronic device 102 is illustrated which may be of the type described above with reference to FIG. 1 or 2. The electronic device communication with a network provider 120 through a network 104. The network 104 and network provider 120 may be of the type described above. For example, the network provider 120 provides networks services to POS terminals and may be a credit card network provider such as Visa™, Mastercard™ or American Express™.

The electronic device 102 is also coupled to a provisioning system 410 through the network 104. In the embodiment illustrated in FIG. 4, the provisioning system 410 is not provided together with an issuer system. The provisioning system 410 is a system that is distinct from the issuer system. The provisioning system 410 is in communication with a plurality of issuer systems and, in the example, is in communication with two issuer systems—a first issuer system 412 and a second issuer system 414. Each of these issuer systems 412, 414 may be associated with a different issuer. For example, the first issuer system 412 may be associated with a first issuer (e.g., a first bank) while the second issuer system 414 may be associated with a second issuer (e.g., a second bank).

One or more of the issuer systems 412, 414 may be remotely located from the provisioning system and may be owned and operated by a party that does not own or operate the provisioning system. While FIG. 4 illustrates a connection between the provisioning system 410 and the issuer systems 412, 414 which does not rely on the network 104, in other embodiments, communication may be through the network.

Figure 5:
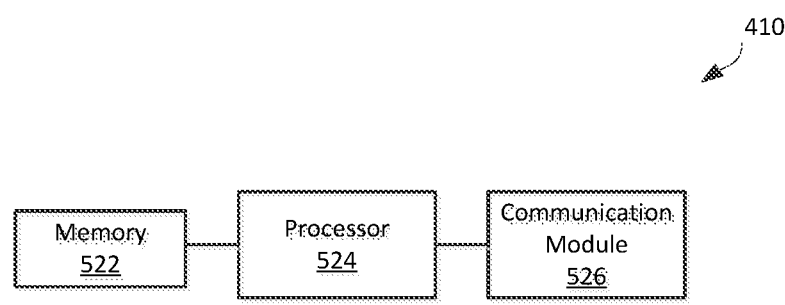
FIG. 5 is a block diagram of a provisioning system in accordance with example embodiments.

Referring now to FIG. 5, a block diagram of example components of a provisioning system 410 are illustrated.

The provisioning system 410 includes at least one processor 524, memory 522 coupled to the processor 524 and a communication module 526 coupled to the processor 524. The communication module 526 may include subsystems for wired or wireless data communication. The communication module 526 allows the provisioning system 410 to send and receive electronic messages. For example, the communication module 526 may allow electronic messages to be sent and received over the network 104 (FIG. 4).

The memory 522 may include volatile and non-volatile memory. At least a part of the memory 522 may store processor-readable instructions that, when executed by the processor, cause the processor 524 to carry out some of the operations described herein.

The memory 522 may store issuer evaluation criteria which may be used when evaluating a provisioning request from the electronic device 102. The issuer evaluation criteria may include first issuer evaluation criteria associated with the first issuer system 412 and second issuer evaluation criteria associated with the second issuer system 414. The first issuer evaluation criteria may be used for evaluating provisioning requests associated with the first issuer while the second issuer evaluation criteria may be used for evaluating provisioning requests associated with the second issuer. In at least some embodiments, the issuer systems may provide respective issuer evaluation criteria to the provisioning system 410. For example, the first issuer system 412 may provide first issuer evaluation criteria and the second issuer system 414 may provide second issuer evaluation criteria. The provisioning system may receive this criteria as a signal at the communication module 526 and may store the criteria in memory 522 for retrieval when a provisioning request is received.

Figure 6:
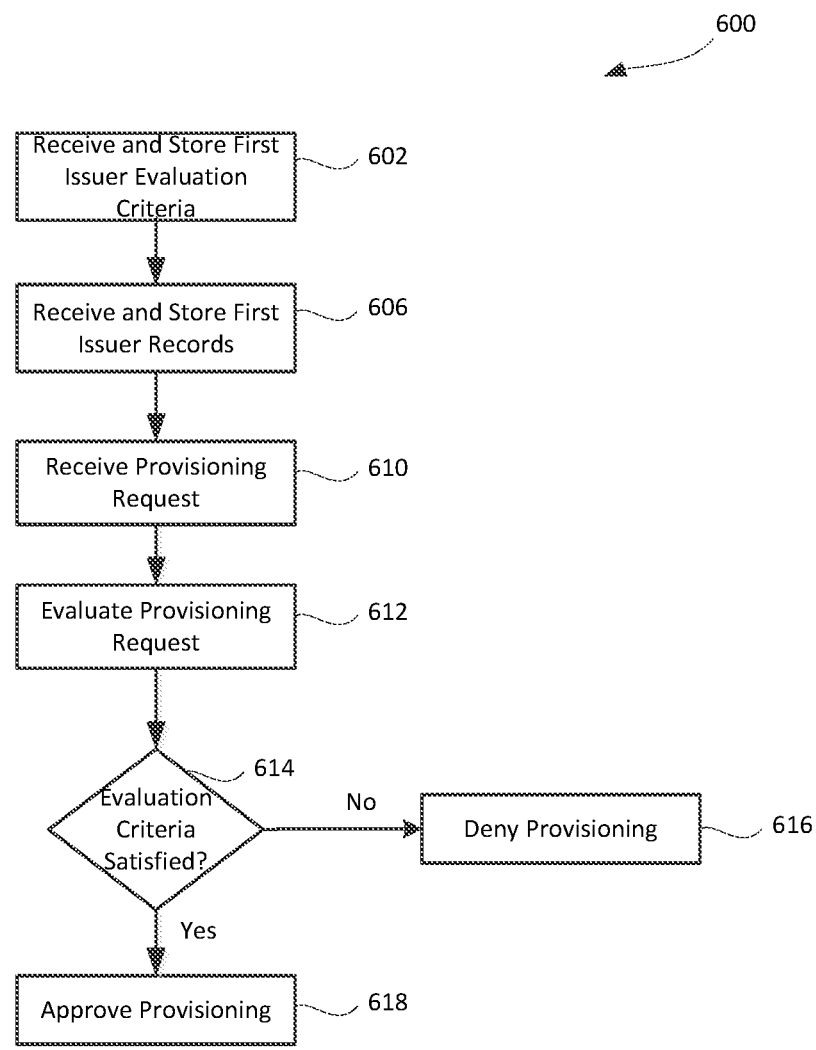
FIG. 6 is a flowchart of a method for provisioning a secure application in accordance with example embodiments.

Reference will now be made to FIG. 6 which illustrates a flowchart of an example method 600 for provisioning a secure application on an electronic device. The method 600 may be performed by a provisioning system 410. More particularly, the method 600 may be performed by a processor 524 which executes processor-executable instructions stored in memory 522. The processor executable instructions, when executed, configure the processor 524 to perform the method 600.

At operation 602, the provisioning system 410 receives first issuer evaluation criteria. The first issuer evaluation criteria may be received from a first issuer system 412 (FIG. 4) which is associated with a first issuer (e.g., a first bank) and may be received at a communication module 526 (FIG. 5). The first issuer evaluation criteria specifies one or more criterion that is to be used by the provisioning system 410 to evaluate a provisioning request that is associated with a first issuer. For example, the first issuer evaluation criteria may be used to evaluate a request to provision a mobile wallet application to allow the mobile wallet application to be used with an account (e.g., a credit card account) that is provided by the first issuer (e.g., a credit card issuer).

The first issuer evaluation criteria may, at operation 602, be stored in memory 522 of the provisioning system 410 so that it may be used to evaluate a future provisioning request.

At operation 606, the provisioning system 410 receives a signal via the communication module 526 representing first issuer records. The signal is received from the first issuer system 412 associated with the first issuer. The first issuer records include customer data for a plurality of customers associated with the first issuer. For example, the first issuer records may include data regarding credit cards that have been issued by the first issuer. Each first issuer record may be associated with a specific customer or a specific account. The first issuer records may include customer identity information such as a name address, date of birth, telephone number, email address or postal address associated with the customer. In some embodiments, the first issuer records may include device identifying information which identifies a device that a customer sometimes uses to communicate with systems operated by the first issuer. For example, an IMEI or IMSI may be stored in a first issuer record and the first issuer system may have obtained this information when a customer previously used the electronic device 102 associated with the IMEI or IMSI to access a service provided by the first issuer. For example, when a customer accesses a banking application on their electronic device 102, the banking application may provide a device identifier to the first issuer system (which provides back-end services for the banking application) and may store it in a first issuer record. Then, at operation 606, the first issuer record containing the device identifier is provided to the provisioning system 410.

A first issuer record may also include transactional information which may be metadata specifying recent transactions on an account associated with that first issuer record. For example, the metadata may provide information about a location of a transaction (e.g., a geographic location of a POS terminal where a credit card associated with the first issuer record was used), a dollar value representing an amount of the transaction, etc.

The first issuer record also includes account identification information. For example, an account number associated with an account represented by the first issuer record may be included. This account number may be a primary account number (PAN), which may also be referred to as a credit card number. The account identification information may also include an expiry data and/or CVV associated with a payment card having the PAN.

The first issuer record may include other information such as, for example, fraud information (e.g., a notification that fraudulent activity has been detected for the associated account), information about a model of electronic device that a user typically uses to communicate with first issuer systems, etc.

The first issuer records may be continuously or periodically updated, at the provisioning system 410, to provide the provisioning system 410 with up-to-date information. For example, as new accounts are added into the first issuer system 412, the first issuer system 412 may provide first issuer records for the new account(s) to the provisioning system 410. As information for an account is updated (e.g., if address information is updated, transactions are added to the account, fraud is detected, etc.), the first issuer system 412 may provide updated first issuer records to the provisioning system 410.

When the first issuer records are received at operation 606, at least a portion of the first issuer records may be stored in memory 522 associated with the provisioning system 410.

At some time after the first issuer records are received and stored and the first issuer evaluation criteria is stored in memory of the provisioning system 410, the provisioning system 410 receives a provisioning request from an electronic device 102. For example, at operation 610, a signal is received, via the communication module 526 of the provisioning system 410. The signal is received from the electronic device 102 (and, in particular, may be received when a second secure application, such as a banking application, on the electronic device, causes the signal to be generated). The signal represents a provisioning request to provision the secure application with first issuer data. The provisioning request may be sent from the electronic device 102 at operation 516 of the method 500 of FIG. 3 and, as such, the provisioning device received at operation 610 of the method 600 of FIG. 6 may include information of the type described above with reference to operation 516 of the method 500 of FIG. 3. For example, the provisioning request includes identifying information such as an account number and may include, for example, an expiry date, a CVV, device information, a geolocation of the electronic device, address information, version information and/or login credentials.

At operation 612, the provisioning system 410 evaluates the provisioning request. More particularly, the provisioning system 410 evaluates the provisioning request based on at least one of the first issuer evaluation criteria, the first issuer records, and the identifying information in the provisioning request. For example, an account number in the provisioning request (such as a PAN) may be used to identify one of the first issuer records associated with the request. Then, information in that first issuer record may be evaluated against other data in the provisioning request to determine whether the provisioning request is likely an authentic provisioning request from a true customer of the account or whether it is likely fraudulent. In at least some embodiments, at operation 612, the provisioning system 410 may determine a score for a provisioning request and this score may be used (at operation 614) to determine whether the provisioning request satisfies the first issuer evaluation criteria. The provisioning request may be determined to satisfy the first issuer evaluation criteria when the score satisfies the first issuer evaluation criteria.

For example, where the provisioning request includes a geolocation of the electronic device, the provisioning system 410 may compare the geolocation specified in the provisioning request to location information in the identified first issuer record. For example, the provisioning system 410 may consider the location of recent transactions or a location specified in address information defined in the first issuer record. Certain discrepancies in this information may be deemed by the provisioning system 410 to represent possible fraudulent activity and may cause the provisioning system to deny a provisioning request. As noted above, in some embodiments, a score for a provisioning request may be determined and, when the geolocation specified by in the provisioning request does not correspond with an expected location determined from the first issuer record, the score may be adjusted accordingly. For example, in such a situation, the score may be negatively adjusted.

By ways of further example, in some embodiments, address information received in the provisioning request may be compared to address information in the identified first issuer record. For example, an email address or telephone number in the provisioning request may be compared to an email address or telephone number in the identified in the first issuer record. The provisioning system may interpret corresponding address information as an indication that the provisioning request is likely authentic and may interpret discrepancies as an indication of possible fraudulent activity and the score may be adjusted accordingly.

In some embodiments, the provisioning system 410 may also compare identifying information in the provisioning request to blacklist or whitelist information. The blacklist or whitelist information may be stored in a global list. That is, the blacklist or whitelist information may not be stored in a specific first issuer record associated with a specific account. Rather, the blacklist or whitelist information may be stored in a global list which may be used for all provisioning requests, irrespective of the account number associated with such requests.

By way of example, in one embodiment, a device blacklist may specify IMEI values for electronic devices that have been deemed to be risky. For example, the list may include IMEI values of electronic devices that have been reported stolen or that have been used to engage in fraudulent behavior in the past. When the provisioning system 410 determines that a provisioning request includes an IMEI value that is included in the device blacklist, the provisioning system 410 may determine that the first issuer evaluation criteria has not been satisfied (at operation 614) and may deny the provisioning request (at operation 616). In some embodiments, when the provisioning system 410 determines that a provisioning request includes an IMEI value that is included in the device blacklist, the score may be negatively adjusted (i.e., adjusted to make provisioning approval less likely than prior to the adjustment).

In some embodiments, a version blacklist may specify a version of electronic device software (such as a version of an operating system 229 or first secure application 221) that is considered to be unsecure. When the provisioning system 410 determines that a provisioning request includes a version identifier that is included in the version blacklist, the provisioning system 410 may determine that the first issuer evaluation criteria has not been satisfied (at operation 614) and may deny the provisioning request (at operation 616). In some embodiments, when the provisioning system 410 determines that a provisioning request includes a version identifier that is included in the version blacklist, the score may be negatively adjusted (i.e., adjusted to make provisioning approval less likely than prior to the adjustment).

Accordingly, numerous criteria may be used (at operation 612) to evaluate the provisioning request including, for example, a geolocation of the electronic device making the provisioning request, an email address associated with the electronic device, a telephone number associated with the electronic device, login credentials associated with the electronic device, version information associated with the electronic device, or an identifier of the electronic device. At operation 614, the provisioning system 410 determines whether the first issuer evaluation criteria is satisfied and, when the first issuer evaluation criteria is not satisfied (e.g., if the score associated with the provisioning request is less than a threshold specified in the first issuer evaluation criteria), then the provisioning request may be denied (at operation 616). In such embodiments, the provisioning system 410 may transmit a message to the electronic device 102 to inform the electronic device that the provisioning request has been denied.

If, however, at operation 614, the evaluation criteria is determined to be satisfied, then the provisioning system 410 generates a signal using the communication module 526 to provide (at operation 618) first issuer data to the electronic device to provision the secure application on the electronic device. As noted above, in some embodiments, the secure application may be a mobile wallet application and the first issuer may be a credit card issuer and, at operation 618, the mobile wallet application may be provisioned to be used for mobile payments with a credit card provided by the first issuer.

The method 600 of FIG. 6 illustrates an embodiment in which the first issuer system provides first issuer records to the provisioning system 410 before the provisioning request is received. That is, the first issuer records are pushed to the provisioning system 410 to allow the provisioning system 410 to quickly process provisioning requests when they are received. That is, since the provisioning system 410 already stores the first issuer evaluation criteria and the first issuer records, the provisioning system 410 is able to process provisioning requests rapidly since it may, in at least some embodiments, approve or deny a provisioning request without having to seek approval from the issuer system on a per-request basis. However, in other embodiments, at least some of the information in the first issuer records may be provided on a pull basis. That is, in some embodiments, the provisioning system 410 may request information from the first issuer system 412 after a provisioning request is received.

While not illustrated in FIG. 6, in some embodiments, while the method 600 is being performed, the first issuer system may authenticate a session with the electronic device 102. For example, as explained above with reference to FIG. 3, a second secure application may be used to facilitate authentication of a session. In some such embodiments, the first issuer system may perform the authentication of a session (e.g., by evaluating authentication credentials provided during operation 514 of the method 500 of FIG. 3) and the provisioning system 410 may then be engaged to engaged to perform the provisioning. That is, the first issuer system may evaluate the authentication credentials (e.g., which may include a bank account number and a password associated with the second secure application) and may then hand off the session to the provisioning system 410. In this manner, the provisioning system is able to rely upon the authentication provided by the second secure application and the first issuer system, but the first issuer system need not share the authentication credentials with the provisioning system.

The method 600 of FIG. 6 may also be used in embodiments which do not rely upon the second secure application. That is, in some embodiments of the method 600 of FIG. 6, the second secure application is not engaged during the provisioning of the first secure application.

Figure 7:
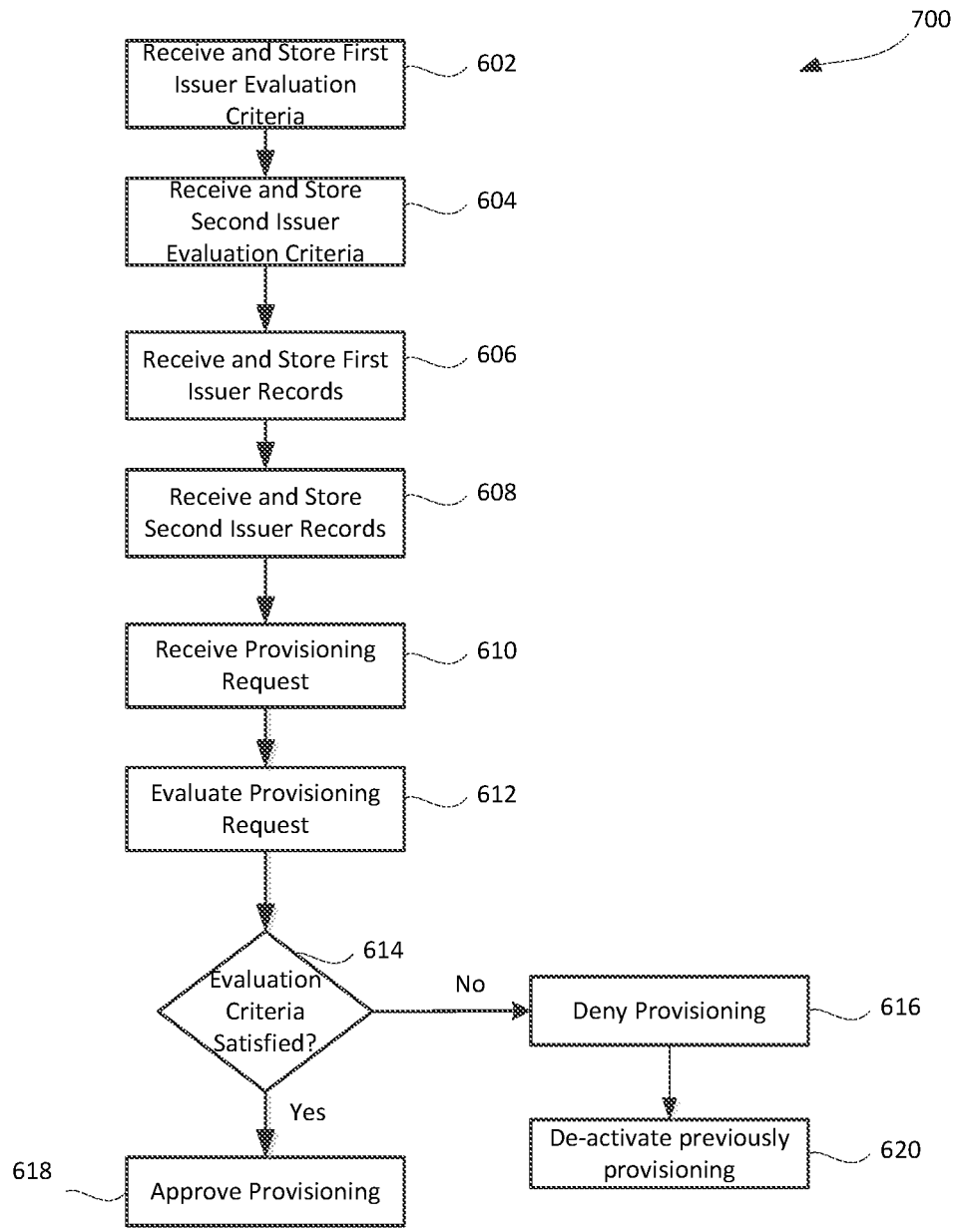
FIG. 7 is a flowchart of a method for provisioning a secure application in accordance with example embodiments.

Reference will now be made to FIG. 7 which illustrates a flowchart of a further example method 700 for provisioning a secure application on an electronic device. The method 700 may be performed by a provisioning system 410. More particularly, the method 700 may be performed by a processor 524 which executes processor-executable instructions stored in memory 522. The processor executable instructions, when executed, configure the processor 524 to perform the method 700.

The method 700 of FIG. 7 includes a number of operations in common with the method 600 of FIG. 6 and the discussion of these operations will not be repeated in full. However, like reference numerals are used to indicate similar operations.

In the method 700 of FIG. 7, the provisioning system receives evaluation criteria from multiple issuer systems. For example, first issuer evaluation criteria is received from a first issuer and second issuer evaluation criteria is received from a second issuer. The first issuer evaluation criteria may be used to evaluate provisioning requests associated with the first issuer and the second issuer evaluation criteria may be used to evaluate provisioning requests associated with the second issuer. Similarly, in some embodiments, the evaluation criteria may be used, by the provisioning system, to determine whether to deactivate previous provisioning data (such as previous first issuer data that allows the first secure application to be used with an account provided by the first issuer or previous second issuer data that allows the first secure application to be used with an account provided by the second issuer). For example, when a provisioning request is received and the provisioning request is a request to provision the first secure application for use with an account provided by the first issuer, the provisioning system 410 may also evaluate the request against the second issuer evaluation criteria to determine whether issuer data associated with the second issuer should be deactivated. For example, if it appears that the provisioning request represents fraudulent activity, issuer data previously used to provision the first secure application for use with the second issuer may be deactivated.

In the method 700 of FIG. 7, the provisioning system also receives issuer records from multiple issuer systems. For example, first issuer records are received from a first issuer system and second issuer records are received from a second issuer system. This allows the provisioning system to quickly process provisioning requests associated with either the first issuer or the second issuer. Furthermore, in at least some embodiments, the availability of both first issuer records and second issuer records can allow the provisioning system 410 to use additional techniques for detecting possible fraudulent activity. For example, when a provisioning request is received and is associated with a first issuer (e.g., is associated with an account provided by the first issuer), the provisioning system 410 may also evaluate the provisioning request based on second issuer records received from the second issuer system.

An overview having been provided, operations of the method 700 of FIG. 7 will now be discussed. At operation 602, the provisioning system 410 receives and stores first issuer evaluation criteria. Operation 602 may be performed in the manner described above with reference to operation 602 of the method 600 of FIG. 6.

At operation 604, the provisioning system 410 receives and stores second issuer evaluation criteria. The second issuer evaluation criteria may be received from a second issuer system 414 (FIG. 4) which is associated with a second issuer (e.g., a second bank) and may be received at a communication module 526 (FIG. 5). The second issuer evaluation criteria specifies one or more criterion that is to be used by the provisioning system 410 to evaluate a provisioning request that is associated with the second issuer. For example, the second issuer evaluation criteria may be used to evaluate a request to provision a mobile wallet application to allow the mobile wallet application to be used with an account (e.g., a credit card account) that is provided by the second issuer (e.g., a second credit card issuer such as a second bank).

The second issuer evaluation criteria may, at operation 604, be stored in memory 522 of the provisioning system 410 so that it may be used to evaluate a future provisioning request.

At operation 606, the provisioning system receives and stores first issuer records in the manner described above with reference to operation 606 of the method 600 of FIG. 6.

At operation 608, the provisioning system 410 receives a signal via the communication module 526 representing second issuer records. The signal is received from the second issuer system 414 associated with the second issuer. The second issuer records include customer data for a plurality of customers associated with the second issuer. For example, the second issuer records may include data regarding credit cards that have been issued by the second issuer. Each second issuer record may be associated with a specific customer or a specific account. The second issuer records may include customer identity information such as a name address, date of birth, telephone number, email address or postal address associated with the customer. In some embodiments, the second issuer records may include device identifying information which identifies a device that a customer sometimes uses to communicate with systems operated by the second issuer. For example, an IMEI or IMSI may be stored in a second issuer record and the second issuer system may have obtained this information when a customer previously used the electronic device 102 associated with the IMEI or IMSI to access a service provided by the second issuer. For example, when a customer accesses a banking application on their electronic device 102, the banking application may provide a device identifier to the second issuer system (which provides back-end services for the banking application) and may store it in a second issuer record. Then, at operation 608, the second issuer record containing the device identifier is provided to the provisioning system 410 and at least a portion of the second issuer records are stored at the provisioning system 410.

While not illustrated in FIG. 7, in some embodiments, the provisioning system 410 may compare information in the first issuer records with information in the second issuer records. By way of example, customer information such as a name, address, date of birth or telephone number may be compared to related records. Based on this comparing the provisioning system 410 may generate a link between related records (e.g., records that appear to be related to a common customer). For example, a link may be generated between a first one of the first issuer records and a first one of the second issuer records.

At operation 610, the provisioning system 410 receives the provisioning request. The provisioning request may be received in the manner described above with reference to operation 610 of the method 600 of FIG. 6. As noted in the discussion above, the provisioning request includes identifying information. In at least some embodiments of the method 700, the identifying information includes second issuer profile information for a second issuer associated with second issuer data for which the secure application has already been provisioned. For example, the second issuer profile information may identify an account, associated with the second issuer, that the secure application has already been provisioned to use.

At operation 612, the provisioning system 410 evaluates the provisioning request. The provisioning request may be evaluated in the manner described above with reference to operation 612 of the method 600 of FIG. 6. The provisioning request may be a request to provision the secure application for use with an account provided by the first issuer. Accordingly, in evaluating the provisioning request, at operation 612 the provisioning system 410 considers one or more of the first issuer records received at operation 606. However, in at least some embodiments, at operation 612, the provisioning system 410 may also evaluate the provisioning request using information in one or more of the second issuer records. In at least some embodiments, a related one of the second issuer records may be identified based on customer information in the records. That is, the provisioning system 410 may determine that the provisioning request is associated with a first one of the first issuer records and may then use information in the identified first issuer record to identity a second issuer record associated with the same person. For example, the provisioning system 410 may identify a second issuer record associated with a customer having the same name, address, telephone number and/or date of birth, etc. As noted previously, in some embodiments, the comparing of records in order to identify related records may be performed before the provisioning request is received and related records may be linked. In such embodiments, at operation 612, the provisioning system 410 may determine, based on the link, that a customer associated with the provision request is associated with a first one of the second issuer records and may then rely on that first one of the second issuer records in evaluating the provisioning request.

In some embodiments in which the provisioning request includes second issuer profile information, an associated one of the second issuer records may be identified using the second issuer profile information. In such embodiments, this associated second issuer record may be considered by the provisioning system 410 when evaluating the provisioning request at operation 612. For example, location information, customer information, etc. specified in the second issuer record may be useful in attempting to detect a possible fraudulent provisioning.

At operation 614, the provisioning system 410 determines whether evaluation criteria has been satisfied and, if so, the provisioning request is approved (at operation 618). If the evaluation criteria is not satisfied, the provisioning request is denied at operation 616. Operations 614, 616 and 618 are described in greater detail above with reference to the method 600 of FIG. 6.

In some embodiments, when the provisioning system 410 determines that the provisioning request does not satisfy first issuer evaluation criteria (at operation 613), the provisioning system 410 deactivates previous provisioning on the electronic device (at operation 620). For example, when the provisioning request does not satisfy the first issuer evaluation criteria, the provisioning system may deactivate second issuer data on the electronic device. As noted above, the second issuer data may be data that enables the secure application to be used with an account provided by a second issuer. Thus, in operation 620, the provisioning system may deactivate this second issuer data so that the secure application can no longer be used without that account. In some embodiments, at operation 620, the provisioning system 410 may deactivate all previously activated issuer data associated with the secure application on the electronic device so that the secure application can no longer be used for transactions.

Thus, in some embodiments, when a provisioning request from an electronic device is deemed to be too risky to allow provisioning, other prior provisioning may be automatically deactivated to prevent fraud. In other embodiments, each issuer may rely on its own issuer evaluation criteria when evaluating provisioning requests. For example, as noted above, at operation 604, second issuer evaluation criteria may be received and stored in memory. When a provisioning request is received at operation 610 and the provisioning request is associated with a first issuer (e.g., is a request to provision the secure application with first issuer data for use with the first issuer), the provisioning system may determine whether second issuer evaluation criteria is satisfied. When the second issuer criteria is not satisfied, the provisioning system 410 deactivates the second issuer data associated with the second issuer on the electronic device.

While not illustrated in FIG. 7, in some embodiments, while the method 700 is being performed, the first issuer system may authenticate a session with the electronic device 102. For example, as explained above with reference to FIG. 3, a second secure application may be used to facilitate authentication of a session. In some such embodiments, the first issuer system may perform the authentication of a session (e.g., by evaluating authentication credentials provided during operation 514 of the method 500 of FIG. 3) and the provisioning system 410 may then be engaged to engaged to perform the provisioning. That is, the first issuer system may evaluate the authentication credentials (e.g., which may include a bank account number and a password associated with the second secure application) and may then hand off the session to the provisioning system 410. In this manner, the provisioning system is able to rely upon the authentication provided by the second secure application and the first issuer system, but the first issuer system need not share the authentication credentials with the provisioning system.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

Certain adaptations and modifications of the described embodiments can be made. Therefore, the above discussed embodiments are considered to be illustrative and not restrictive.

What is claimed is:

1. A provisioning system for provisioning a mobile wallet application on an electronic device, the provisioning system comprising:
   a communication module;
   a memory; and
   a processor coupled with the memory and the communication module, the processor programmed with processor-executable instructions which, when executed, cause the processor to:
      receive a signal via the communication module representing first issuer records from a first issuer system associated with a first issuer of payment cards, the first issuer records including customer data for a plurality of customers associated with the first issuer;
      store at least a portion of the first issuer records in the memory;
      receive a signal via the communication module from the electronic device representing a provisioning request to provision the mobile wallet application with first issuer data for the first issuer, the provisioning request including geolocation data for the electronic device identifying a present location of the electronic device and second issuer profile information for a second issuer associated with second issuer data for which the mobile wallet application has already been provisioned;
      evaluate the provisioning request based on identifying information included in the provisioning request, wherein evaluating the provisioning request includes:
         identifying a first issuer record associated with the provisioning request;
         identifying a second issuer record associated with the second issuer data;

comparing the geolocation data for the electronic device to location information indicated in the first issuer record and the second issuer record; and in response to the comparing:

when the provisioning request satisfies location-based evaluation criteria with respect to the first and second issuer records, generate a signal using the communication module to provide the first issuer data corresponding to a payment card issued by the first issuer to the electronic device to provision the mobile wallet application on the electronic device to allow the electronic device to use an account associated with that payment card for making mobile payments; and when the provisioning request does not satisfy the location-based evaluation criteria, send, to the electronic device, a signal including a command to deactivate second issuer data associated with the second issuer on the electronic device.

2. The provisioning system of claim 1, wherein the processor-executable instructions further cause the processor to:

compare information in the first issuer records with information in second issuer records associated with the second issuer; and based on the comparing, generate a link between a first one of the first issuer records and a first one of the second issuer records, wherein the determination that the customer associated with the provisioning request is associated with the first one of the second issuer records is made based on the link.

3. The provisioning system of claim 1, wherein the processor-executable instructions, when executed, further cause the processor to:

when the provisioning request does not satisfy the location-based evaluation criteria, deactivate all previously activated issuer data associated with the mobile wallet application on the electronic device.

4. The provisioning system of claim 1, wherein the memory has stored therein third issuer evaluation criteria for a third issuer for which the mobile wallet application has already been provisioned, and wherein the processor-executable instructions, when executed, further cause the processor to:

in response to receiving the provisioning request to provision the mobile wallet application with the first issuer data:

when the provisioning request does not satisfy the third issuer evaluation criteria, deactivate third issuer data associated with the third issuer on the electronic device.

5. The provisioning system of claim 1, wherein evaluating the provisioning request comprises determining a score for the provisioning request and wherein the provisioning request satisfies the location-based evaluation criteria when the score satisfies the location-based evaluation criteria.

6. The provisioning system of claim 1, wherein identifying information used to evaluate the provisioning request comprises one or more of:

an email address associated with the electronic device;
a telephone number associated with the electronic device;
login credentials associated with the electronic device;
version information associated with the electronic device; and
an identifier of the electronic device.

7. An electronic device comprising:
a communication module;
an input interface;
a processor coupled to the communication module and the input interface; and
a memory coupled to the processor, the memory storing a mobile wallet application that, when executed, configures the processor to:

receive, through the input interface, an account identifier;

identify an issuer associated with the account represented by the account identifier;

determine, based on the identified issuer, that a banking application associated with the issuer is installed on the electronic device, the banking application different from the mobile wallet application; and provide a provisioning request to the banking application, wherein the banking application is configured to:

obtain authentication credentials associated with the banking application;

generate, using the communication module, a signal representing the authentication credentials and send the signal to an issuer system associated with the identified issuer for authentication, wherein upon authentication of the authentication credentials, the issuer system establishes an authenticated session with a provisioning system; and obtain, using the authenticated session, issuer data associated with the account for use in provisioning the mobile wallet application to use the account represented by the account identifier for making mobile payments;

after providing the provisioning request to the provisioning system, receive an instruction to deactivate a second account associated with the mobile wallet application; and deactivate the second account.

8. The electronic device of claim 7, wherein the banking application, when executed, configures the processor to:

when the provisioning request is provided to the banking application:

generate a signal using the communication module to provide the provisioning request to the provisioning system via the authenticated session.

9. The electronic device of claim 8, wherein the banking application, when executed, further configures the processor to:

after providing the provisioning request to the provisioning system, receive the issuer data from the provisioning system via the authenticated session; and provide the issuer data to the mobile wallet application.

10. The electronic device of claim 8, wherein the provisioning request includes the account identifier.

11. The electronic device of claim 10, wherein the provisioning request includes an account identifier for a second account for which the mobile wallet application has already been provisioned.

12. The electronic device of claim 8, wherein the provisioning request includes one or more of:

a geolocation of the electronic device;
an email address associated with the electronic device;
a telephone number associated with the electronic device;
login credentials associated with the electronic device;
version information associated with the electronic device; and
an identifier of the electronic device.

13. The electronic device of claim 8, wherein the authentication credentials include login credentials associated with the banking application.

14. The provisioning system of claim 1, wherein comparing the geolocation data for the electronic device to location information indicated in the first issuer record and the second issuer record includes comparing the geolocation of the electronic device to a location of a recent transaction.

15. The provisioning system of claim 1, wherein comparing the geolocation data for the electronic device to location information indicated in the first issuer record and the second issuer record includes comparing the geolocation of the electronic device to a location specified in address information defined in the at least one of the first issuer records and the first one of the second issuer records.

16. The provisioning system of claim 1, wherein at least one of the first issuer record and the second issuer record includes transactional information including metadata providing information about a location of a transaction.

\* \* \* \* \*